United States Patent [19]

Briant et al.

[11] Patent Number: 5,109,797

[45] Date of Patent: May 5, 1992

[54] AVIAN INHALATION EXPOSURE CHAMBER

[76] Inventors: James K. Briant; Crystal J. Driver, both of P.O. Box 999, Richland, Wash. 99352

[21] Appl. No.: 574,707

[22] Filed: Aug. 29, 1990

[51] Int. Cl.$^5$ .............................................. A01K 29/00
[52] U.S. Cl. .................................. 119/15; 128/200.14
[58] Field of Search ............... 119/15, 17; 128/200.14; 73/864.83, 864.91

[56] References Cited

U.S. PATENT DOCUMENTS

| 4,479,493 | 10/1984 | Bung et al. | 119/15 |
| 4,520,808 | 6/1985 | LaBauve | 128/200.14 |
| 4,721,060 | 1/1988 | Cannon et al. | 119/15 |
| 4,860,741 | 8/1989 | Bernstein et al. | 119/15 |
| 4,917,046 | 4/1990 | Spengler | 119/15 |

FOREIGN PATENT DOCUMENTS 0121795  10/1984  European Pat. Off. ............... 119/15

Primary Examiner—Robert P. Swiatek
Assistant Examiner—Todd E. Manahan

[57] ABSTRACT

An exposure system for delivering gaseous material ranging in particle size from 0.4 micrometers to 20.0 micrometers uniformly to the heads of experimental animals, primarily birds. The system includes a vertical outer cylinder and a central chimney with animal holding bottles connected to exposure ports on the vertical outer cylinder.

5 Claims, 2 Drawing Sheets

AVIAN INHALATION EXPOSURE CHAMBER

This invention was made with Government support under Contract DE-AC06-76RLO 1830 awarded by the U.S. Department of Energy. The Government has certain rights in the invention.

Field of the Invention

The present invention relates to an exposure chamber for supplying gas, vapor, or aerosol directly to the noses of experimental animals such as birds, and simultaneously obtaining plethysmographic data. In the specification and claims, the term "gaseous material" is used to include gases, vapors, and aerosols, having particulates entrained therein, said particulates having a size from 0.4 to 20.0 micrometers.

BACKGROUND OF THE INVENTION

In many environmental and medical studies, it is necessary to conduct experiments involving the supply of gas or aerosol to experimental animals. Rodents such as rats, and also smaller animals, such as mice, are frequently used for this purpose. In many cases this is done through the use of relatively large chambers in which a number of animals are exposed to a common atmosphere. Such a system is shown in U.S. Pat. No. 4,216,741 to Owen R. Moss. This embodiment produces a highly uniform composition throughout the chamber.

In other cases, however, it is desired to confine the aerosol or gas to the noses alone of the animals. This may be done to reduce the amount of gaseous material used to conduct the exposure, or because it is desired for experimental purposes to restrict the dose primarily to the respiratory system of the animals. This is accomplished by so-called "nose-only exposure chambers", such as shown in U.S. Pat. No. 4,721,060 to William C. Canon, et al., and described in an article by Hsu-Chi Yeh, M. Burt Snipes, and Rick D. Brodbeck of the Inhalation Toxicology Research Institute, American Industrial Hygiene Association Journal 48(3):247-251(1987).

The '060 patent discloses a so-called "flow-past" system in which gaseous material is delivered through a small tube to the nose of each rodent. The tubes cause the flow of the gaseous material to change from vertical to horizontal thereby limiting the size of aerosol that is delivered to the nose of the animal. The Yeh et al article shows a dual-wall chimney-type design for nose-only exposure of rodents. This apparatus is designed for gaseous materials having a particle size range from 0.3 to 15.0 micrometers. Further, there is no provision for exposure of avian species.

Environmental concerns are broadening to include evaluation of avian species exposed to gaseous materials such as microbial pest control agents (MPCAs). Since the avian respiratory tract is fundamentally different from the rodent respiratory tract, the effects of gaseous material exposure of avian species cannot be accurately estimated on the basis of exposure of rodent species.

Experimental studies using birds such as described by (1) M. H. Weeks, L. A. Lawson, R.A. Angerhofer, C.D. Davenport, and N. E. Pennington, "Preliminary Assessment of the Acute Toxicity of Malathion in Animals", Arch. Environ. Contam. Toxicol., 1977, 6:23-31, (2) R. K. Myers, and L. H. Alp, "Pulmonary Clearance and Lesions of Lung and Air Sac in Passively Immunized and Unimmunized Turkeys Following Exposure to Aerosolized *Escherichia Coli*", Avian Diseases, 1987 31:622-628, and (3) C. S. Edison, and S. H. Kleven, "A Comparison of Various Routes of Newcastle Disease Vaccination at One Day of Age", Poultry Science, 1975, 55:1778-1787, have used whole-body exposures of free ranging birds. Whole body exposures do not provide accurate control of exposure of the respiratory tract to gaseous materials especially for gaseous materials having large (up to about 20 micrometers) particle sizes.

SUMMARY OF THE INVENTION

The invention comprises improvements over Cannon et al. and Yeh et al. The improvements include provision for head-only exposure of birds with simultaneous plethysmographic measurements, and provision for efficient exposure to gaseous material having particulates ranging in size from about 0.4 micrometer to about 20 micrometers. Improvements also include provision for cleaning, and overall reduced cost compared to other designs.

Head-only exposure and plethysmographic measurements of birds are accomplished with a bird holder bottle of a size to limit movement of a bird and which is provided with a rubber seal fitted around a bird's neck.

Efficient exposure to gaseous material particles from 0.4 micrometers to 20 micrometers is accomplished by placing birds' heads directly into a vertical gaseous material flow stream thereby avoiding the use and limitations of horizontal flow tubes.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

Description of the Preferred Embodiment(s)

Figure 1:
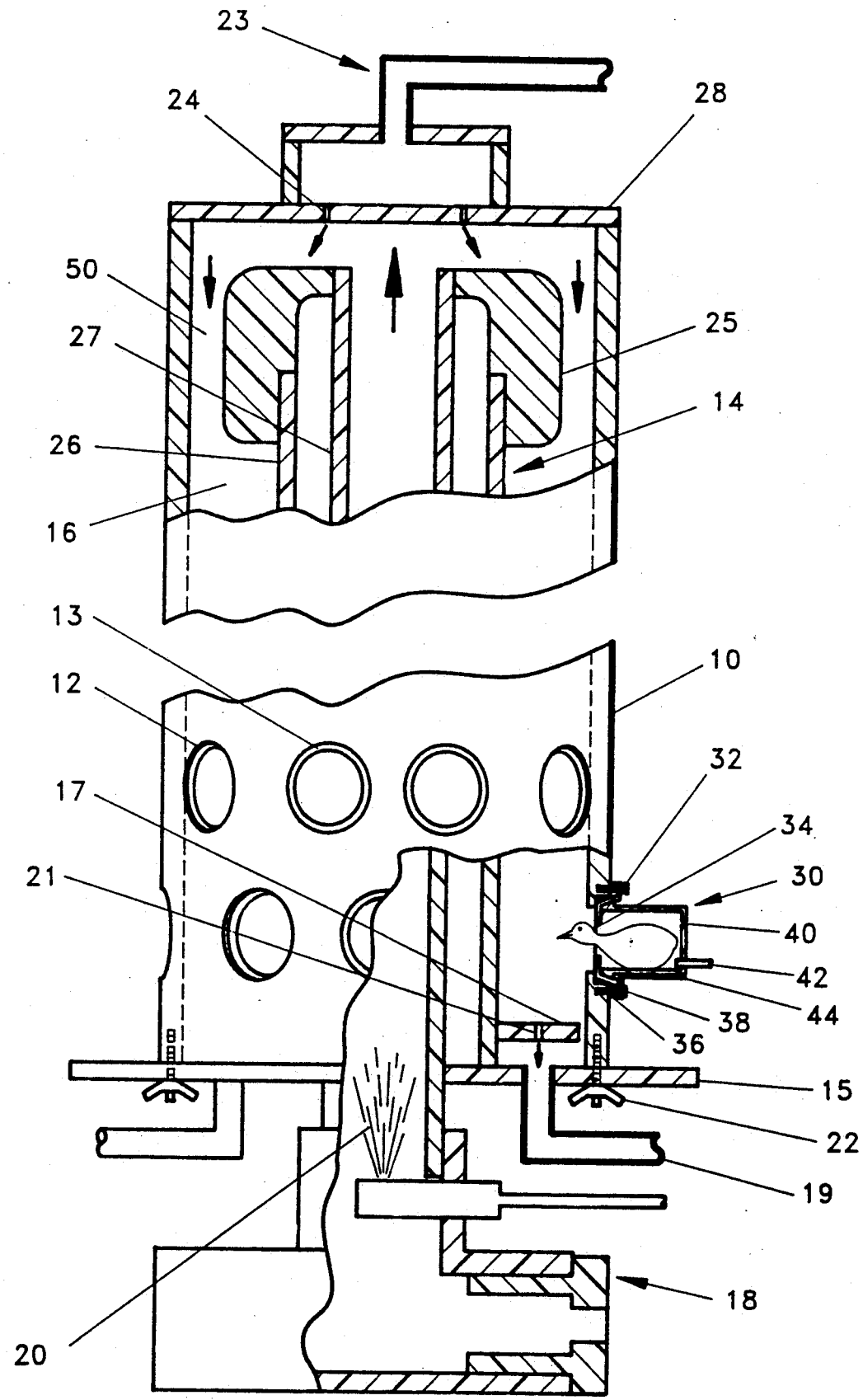
FIG. 1 is a side view of the exposure chamber with cut-away views of internal features.

The exposure chamber is shown in FIG. 1. The exposure chamber comprises four main parts, a vertical outer cylinder (10), a central chimney (14), a gaseous material nebulizer (18), and an animal holding bottle (30). The vertical outer cylinder is substantially closed at the top with a closure disk (28) having a plurality of air inlet apertures (24) which receive dry air from a dry air inlet (23). The vertical outer cylinder is provided with a plurality of exposure ports (12) near the bottom. Each port (12) comprises a countersunk surface (13) on the vertical outer cylinder (10) defining an aperture through the vertical outer cylinder (10). In the preferred embodiment, there are at least two sets of exposure ports (12). Each set of exposure ports (12) is at a different elevation on the vertical outer cylinder (10) and arranged so that the exposure ports of one set is offset from the exposure ports of the other set so that none of the animals positioned in one set of exposure ports are directly above or below the animals positioned in the other set of exposure ports. The bottom of the vertical outer cylinder is substantially closed with a closure ring (15) having exaust ports (19) for spent air and gaseous material removal. The vertical outer cylinder (10) is removably connected to the closure ring (15) with bolts (22).

The central chimney (14) is a hollow cylinder of any cross section shape with a large outside diameter at the top, a smaller outside diameter in the middle, and the smallest outside diameter at the bottom, with the inside diameter constant from top to bottom. The central chimney is placed within the vertical outer cylinder defining an annulus (16). In the preferred embodiment, the large outside diameter at the top of the central chimney is defined by the pipe cap (25) and provides a constriction as at (50) of the vertical annulus (16) which provides resistance to flow thus producing uniform radial distribution of gaseous material in the vertical annulus. The edges of the large diameter are smooth and rounded to prevent flow separation and subsequent impaction of particulates within the gaseous material onto the inner surface of the vertical outer cylinder (10). In the preferred embodiment, the smaller outside diameter of the central chimney is defined by the first wall (26). The first wall (26) and the vertical outer cylinder define the annulus (16). The annulus (16) is sized to provide the minimum cross sectional area for gaseous material flow and still allow sufficient room for the animal's heads. The smallest outside diameter is at the bottom of the central chimney and in the preferred embodiment is defined by the second wall (27). The diameter of the second wall is selected based on requirements for the vertical transport of gaseous material and partuculates.

The central chimney may be constructed of one solid piece having the appropriate outside diameters of the first wall (26), second wall (27), and pipe cap (25), and having the inside diameter of the second wall (27), but this would be more expensive. The space between the two walls (26, and 27) is not used and is sealed at the top of the central chimney by a pipe cap (25). The pipe cap is selected to securely interfit the first wall (26) and is then machined to receive the second wall (27). The bottom of the first wall (26) is sealed against the closure ring (15) while the second wall (27) extends through the closure ring into a gaseous material nebulizer (18).

An exhaust mask (17) is placed above the exhaust ports (19) within the vertical annulus (16) to provide flow resistance which produces uniform radial distribution of gaseous material.

Figure 2:
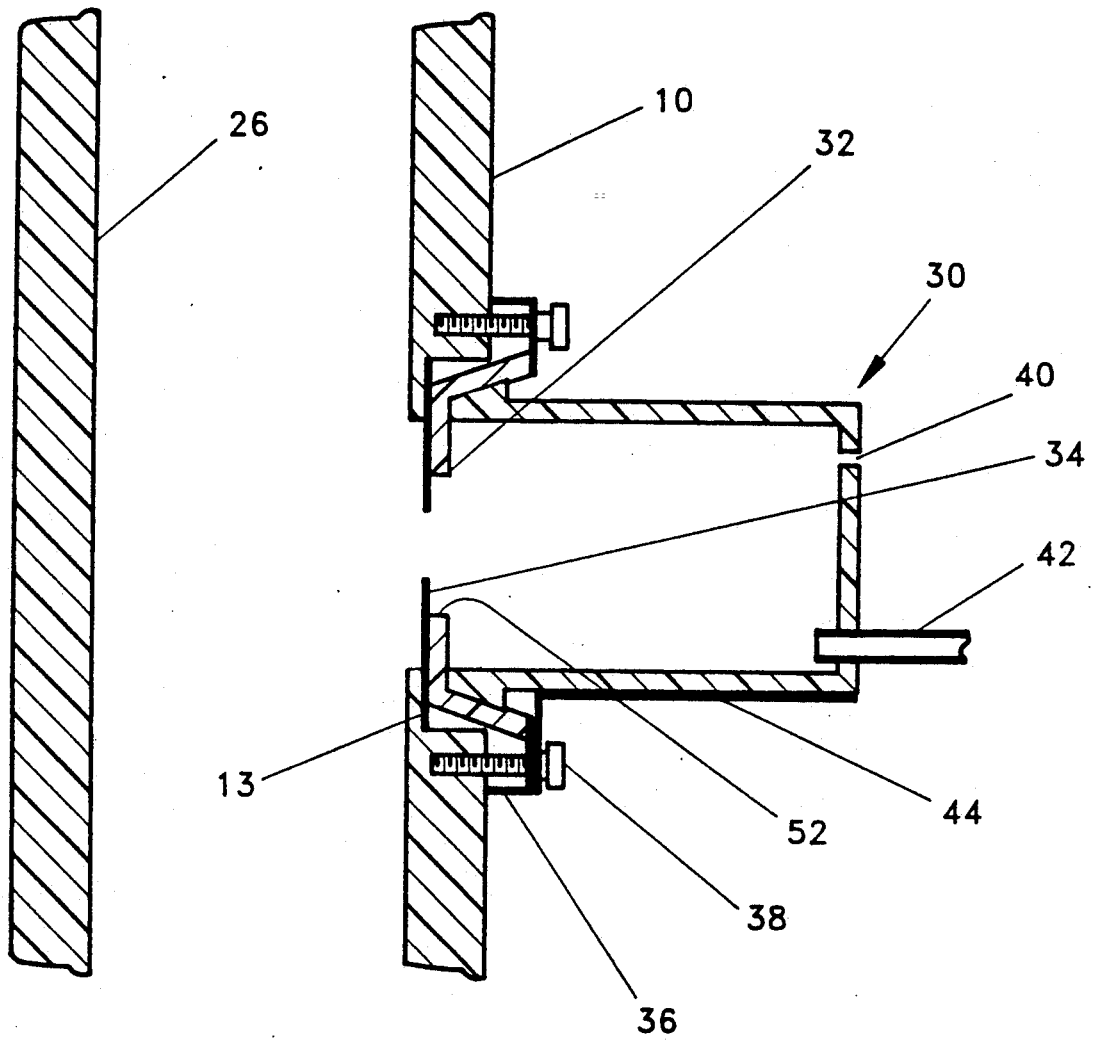
FIG. 2 is an enlarged sectional view of the animal holding bottle.

Each animal holding bottle (30) as illustrated in FIG. 2 is provided with a cap (32) having an aperture (52) to allow an animal's head to extend therethrough into vertical annulus (16). In the preferred embodiment, the cap (32) is threadably connected to the animal holding bottle. The animal holding bottle can be provided with a sealable port (40) for instrumentation that may be used, for example, to monitor animal body temperature. The holding bottle (30) may further be provided with a plethysmograph tube (42) for monitoring the animal respiration. Biotelemetry monitors may also be placed within the holding bottles. The animal holding bottle is connected to the exposure port (12) by a bracket means (36) and connecting means (38) such that as the connecting means are tightened, the bracket means presses the cap (32) of the animal holding bottle (30) against a countersunk surface (13) of the exposure port. The bracket means may be a single circular bracket or at least two individual brackets. The connecting means may be screws, or quick release connectors such as lever-type latches or quarter turn connectors. The connectors may be eliminated altogether by use of a cap having external threads screwed into a threaded exposure port. It may be necessary to support the weight of larger animals and a support bracket (44) may be used.

An elastomeric seal (34) provides an airtight seal between the animal holding bottle and the exposure port and is provided with an aperture of a size to seal around the animal's neck. The aperture may be of any appropriate shape and size and may be in any position (concentric, eccentric, etc.) to seal around the neck of any avian species, preferably 10-day-old ducklings or quail chicks. The elastomeric material can be rubber, plastic, or any material impervious to air at low pressure differentials, and sufficiently flexible to seal comfortably around an animal's neck, yet sufficiently rigid to allow plethysmographic measurements. The elastomeric material must not hinder the breathing of the animal nor cause discomfort. The preferred elastomeric material is dental dam rubber and the preferred thickness is between about 0.2 mm and 0.3 mm. While there are other suitable embodiments, this animal holding arrangement is offers the advantages of simplified animal handling, and ease of cleaning and maintenance.

Gaseous material having particulates of sizes from about 0.4 to 20 micrometers is made such as at (20) in the gaseous material nebulizer (18) comprising an aerosol generator such as a Retec aerosol generator which has the impaction ball removed mounted so that the gaseous material is sprayed upwardly and along the axis of the central chimney (14). Saturated air is used to carry the particles to the vertical annulus (16).

The chamber can be constructed of any material which is chemically inert to the gaseous material and which can be sanitized by heating in an autoclave. The preferred material of construction is chlorinated polyvinyl chloride. Cleaning and maintenance are facilitated by by removing animal holding bottles (30), and disconnecting the vertical outer cylinder (10) from the closure ring (15).

In operation, gaseous material having particulates of sizes from about 0.4 micrometers to about 20.0 micrometers such as at (20) is mixed with saturated air. The mixture flows upwardly through the central chimney (14) and then downwardly into the central annulus (16) between the central chimney (14) and the vertical outer cylinder (10) and then past the animal holding bottles (30) and the animals' heads. Dry air is added through the air inlet (23) to reduce the relative humidity of the air/gaseous material mixture and increase the downward velocity of the mixture in the annular space. The pipe cap has smooth and rounded edges to cooperate with the dry air to achieve the desired velocity. It is preferred to maintain the interior of the chamber at a pressure less than exterior ambient pressure so that flow is into the exposure chamber when a holding bottle is removed. The mixture is exhausted through exhaust ports (19).

Uniform exposure of at least one animal to gaseous material sizes from 0.4 micrometers to 20.0 micrometers is achieved by minimizing horizontal transport of the air/gaseous material mixture. The pipe cap (25) and the dry air entering through inlet apertures (24) direct the mixture uniformly down the annular space (16) between the vertical outer cylinder and the central chimney. To minimize flow disturbances around the animals, heads, ports are arranged at different levels and offset between levels. In addition, the exhaust mask (17) maintains flow uniformity at the bottom of the annular space.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. An exposure system for delivering gaseous material uniformly to the heads of experimental animals, comprising;
   (a) a vertical outer cylinder having a top and bottom, further having a closure disk defining air inlet holes at the top of said vertical outer cylinder, and a plurality of exposure ports near the bottom;
   (b) a cylindrical central chimney interconnected with a gaseous material nebulizer,
   (c) a closure ring in removable sealing engagement with the bottom of said vertical outer cylinder and to which said central chimney is sealed such that a vertical annulus is formed between said vertical outer cylinder and said central chimney,
   (d) exhaust means for removing spent gaseous from said vertical annulus,
   (e) a plurality of animal holding bottles mounted to said exposure ports;
   (f) sealing means to effect an airtight seal between said animal holding bottles and said exposure ports, said sealing means also defining an aperture to sealably engage an animal's neck;
   whereby the animal's head is positioned in said vertical annulus between said outer cylinder said central chimney, such that gaseous material will flow to the head of each animal, and whereby the exposure system can be disassembled by removing animal holding bottles, and disconnecting the vertical outer cylinder from the closure ring.

2. The exposure system according to claim 1, wherein the central chimney comprises;
   (a) a first wall with a top and bottom,
   (b) a second wall with a top and bottom, and
   (c) a pipe cap connecting the tops of said first and second walls, said pipe cap further defining an aperture, whereby the bottom of the first wall is attached to the closure ring and the second wall extends through the closure ring and is attached to the gaseous material nebulizer.

3. The exposure system according to claim 1, wherein said animal holding bottles, comprise;
   (a) a cap defining an aperture permitting the head of an animal to be extended therethrough,
   (b) a bracket means in contact with said cap, and
   (c) connecting means through said bracket means such that tightening said connecting means presses said cap into sealing engagement with said exposure port.

4. The exposure system according to claim 1, wherein the exhaust means comprises;
   (a) exhaust ports on said closure ring, and
   (b) an exhaust mask adjacent the exhaust port.

5. The exposure system according to claim 1, wherein the gaseous material comprises;
   particles having a size from about 0.4 micrometers to about 20.0 micrometers.

* * * * *

UNITED STATES PATENT AND TRADEMARK OFFICE
CERTIFICATE OF CORRECTION

PATENT NO. : 5,109,797

DATED : May 5, 1992

INVENTOR(S) : JK Briant, CJ Driver

It is certified that error appears in the above-indentified patent and that said Letters Patent is hereby corrected as shown below:

On the Title page, please add

--[73] Assignee: Battelle Memorial Institute, Richland, Wash.--.

In claim 1, column 5, line 24, after the word "gaseous", please add --material--.

In claim 1, column 5, line 29, please replace "bottles" with --bottle--.

In claim 1, column 5, line 29, please replace "ports" with --port--.

In the specification, column 2, line 68, please replace "exaust" with --exhaust--.

In the specification, column 4, line 65, please replace the comma "," appearing after the work "animals" with an apostrophe "'".

In the specification, column 4, line 22, please delete the word "is".

UNITED STATES PATENT AND TRADEMARK OFFICE
CERTIFICATE OF CORRECTION

PATENT NO. : 5,109,797
DATED : May 5, 1992
INVENTOR(S) : JK Briant, CJ Driver

It is certified that error appears in the above-indentified patent and that said Letters Patent is hereby corrected as shown below:

In the specification, column 4, line 37, please delete the second occurrence of the word "by".

Signed and Sealed this

Fourth Day of January, 1994

Attest:

BRUCE LEHMAN

Attesting Officer

Commissioner of Patents and Trademarks